Patented May 20, 1941

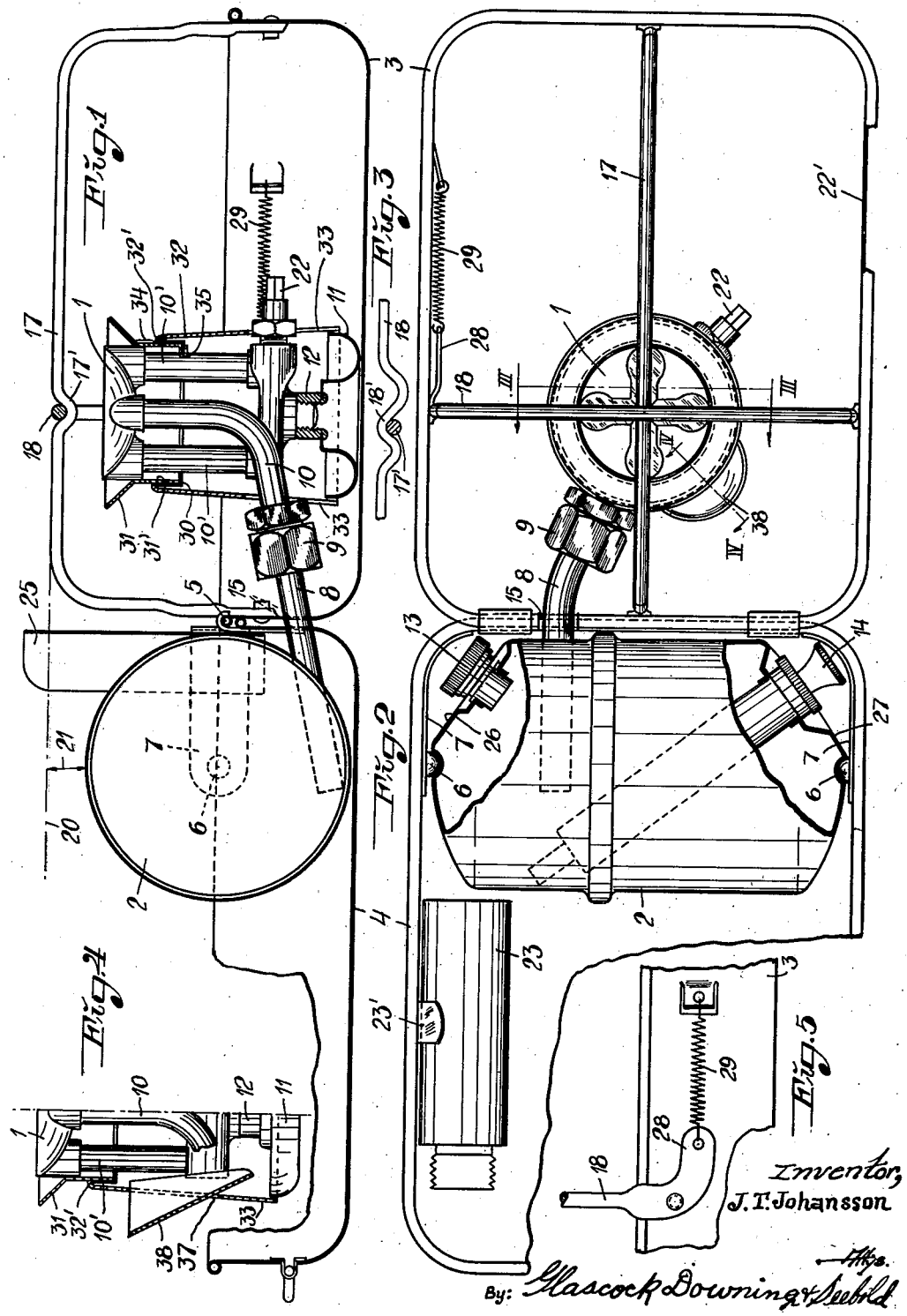

2,242,470

UNITED STATES PATENT OFFICE 2,242,470

OILSTOVE

John Theodor Johansson, Stockholm, Sweden, assignor to Aktiebolaget Radius, Stockholm, Sweden, a corporation of Sweden Application December 7, 1939, Serial No. 308,089
In Sweden December 14, 1938

3 Claims. (Cl. 126—38)

My invention relates to oil stoves, and in particular the invention is concerned with portable oil stoves for burning hydrocarbon, such as kerosene, of the type wherein a burner and a fuel reservoir are arranged in a casing provided with a base portion and a cover hinged thereto.

The principal object of the invention is to provide an oil stove of the type indicated which can be easily put into operative position by opening the cover of the casing. Another object of the invention is to provide means for mounting the burner and the fuel receptacle in the casing in such a manner that the said parts will automatically be moved into operative or inoperative positions as the cover is swung into open or shut position, respectively.

I attain these and other objects by mechanism illustrated in the accompanying drawing, in which:

Fig. 1 is a side elevation of the stove in operative position, the casing and part of the burner being shown in section; Fig. 2 is a plan view of the apparatus shown in Fig. 1; Fig. 3 is a partial section on the line III—III, Fig. 2; Fig. 4 is a partial section on the line IV—IV, Fig. 2; and Fig. 5 shows a detail.

Referring to the drawing, 1 denotes the burner and 2 the fuel reservoir of the stove. 3 denotes the base portion of the casing which is pivotally connected with the cover 4 by means of a hinge 5. The reservoir 2 is pivotally mounted in the cover by means of pins 6 which are provided on strips 7 secured to the edge of the cover.

A fuel pipe 8 communicating with the reservoir and rigidly secured thereto is connected by means of a nut 9 to a vaporizing tube 10 which, as will be seen from Fig. 1, is laterally bent outwardly so that the pipe 8 is located substantially at right angles to the vertical central axis of the burner. Thereby the height of the burner and of the casing is considerably reduced. Immediately below the burner, a starting cup 11 is connected thereto by means of a nut 12. Numeral 25 indicates a removable screen which may be put into the place shown in Fig. 1 when the burner is operated, especially if gasoline is used as a fuel. This screen is removed when the casing is to be shut.

In order to shut the casing, the cover is swung about the pivot 5. Thereby the reservoir will be turned about the pins 6 through an angle of 180° relative to the cover, and the burner will be displaced, due to the rigid connection 8, 9, 10, towards the right so as to provide space for the reservoir 2 at the place where the burner is located in the position shown in the drawing. In order to limit the required space, the reservoir should be disposed close to the hinge 5. The plug 13 for the supply opening of the reservoir and the air pump 14 are advantageously disposed at sunk portions 26 and 27, respectively, of the wall of the reservoir so as to reduce the dimensions of the casing and to permit the reservoir during the turning movement of the cover of adjoining the side walls of the casing as closely as possible.

In the embodiment shown in the drawing, the base portion and the cover of the casing are substantially equal in height so that, in the swung out position of the cover, the base portion and the cover will rest on a common plane. The walls to which the hinge 5 is connected are provided with a recess 15 in which the pipe 8 moves when the cover is opened or closed. The said recess does not extend to the bottom of the casing. As a result thereof, the base portion of the casing provides a bowl below the burner, which presents unburnt fuel leaking out from the burner or starting cup from flowing out of the casing. It will also be seen that the walls of the casing, to which the hinge 5 is connected, provide a protecting screen between the burner and the fuel reservoir.

The support for the cooking-vessel is provided by two crosswise arranged yokes 17 and 18 which are pivotally connected with the respective side walls of the base portion of the casing. The yokes are retained in upward position by means of bent or corrugated portions $17^1$ and $18^1$ (see Fig. 3) forming a locking device. By disposing the yokes in crosswise relation, a steady support is provided even for very small vessels.

The yoke 17 can be swung down towards one of the longer side walls of the casing, and the yoke is preferably so dimensioned that it adjoins the side wall in turned-down position. The yoke 18 can be swung down to the right as viewed in the drawing. As shown in Figs. 2 and 5, one end of the yoke 18 is bent to the right so as to form one arm 28 of a lever. Connected to the arm 28 is a helical spring 29 which is secured to the wall of the casing and which tends to turn the yoke 18 into upright position. As will be seen from the drawing, the yoke 18 is located in the path of movement of the reservoir in a manner such that the yoke will be turned downwards by contact with the reservoir when the cover is closed. Thereby the spring 29 will be loaded. The height of the yokes is advantageously dimensioned such that the plane 20 of the support formed by the yokes is located at some distance 21 above the top of the reservoir 2. As a result thereof, the hot combustion gases can freely pass at some distance from the reservoir, even if no screen 25 be provided.

Numeral 22 indicates the rectangular end of the stem of a fuel shut-off valve (not shown). The axis of the stem is directed against an opening 22¹ in the wall of the casing, through which a suitable tool can be introduced to actuate the fuel valve. Numeral 23 indicates a reservoir for starting fuel, such as alcohol, said reservoir being secured to the wall of the cover by means of a spring clamp 23¹.

The burner shown in the drawing is provided with a wind screen 32. In order to avoid any loose parts, the wind screen is connected to parts belonging to the burner. 30 denotes the burner ring which is angular in cross-section and soldered to the bent vaporizing tube 10 and to two other vaporizing tubes 10¹. The burner ring 30 serves as a guide for the distributing ring 31 the vertical portion 31¹ of which is introduced into the burner ring. Before mounting the distributing ring 31, the wind screen 32 is put on the burner ring. The wind screen is in the form of an undivided cylinder the upper edge 32¹ of which is bent inwards and rests on the upper edge of the burner ring. On its lower portion, the wind screen has openings 33 for the vaporizing tube 10 and the stem 22 of the fuel valve.

After the wind screen has been mounted, the distributing ring 31, 31¹ is put into its position. The distributing ring has one or more projections 34 which rest on the inwardly bent edge 32¹ of the wind screen. At its lower edge, the distributing ring has shoulders 35 which, when the burner is to be assembled, are bent about the inner edge of the burner ring so as to retain the burner ring as well as the wind screen. The shoulders 35 are disposed between the tubes 10 and 10¹ and are accessible from below after removing the starting cup 11. In the wall of the wind screen there is provided an opening 37 (see Fig. 4) through which extends a channel 38 which is soldered to the wind screen and which serves as a supply conduit for the starting fuel to be supplied to the starting cup 11.

As will be evident from the above description, the stove according to my invention can be disposed within a casing of small dimensions and without any loose parts. Further, the casing forms a fire-proof support for the stove and provides an efficient screen between the burner and the fuel reservoir.

The total height of the casing in closed position need not be substantially greater than the diameter of the fuel reservoir, because of the fact that the vaporizing tube 10 is bent laterally outwardly so that the height of the burner together with the starting cup can be made substantially equal to the diameter of a fuel reservoir of proper capacity.

The invention is not limited to the specific embodiment exemplified in the drawing.

What I claim is:

1. A portable oil stove comprising a casing having a base portion and a cover, a hinge for connecting a wall of said base portion to a wall of said cover, a burner disposed in said base portion, a fuel reservoir pivotally mounted in said cover, said cover being arranged to be swung through an angle of about 180° relative to said base portion, whereby to separate said burner from said fuel reservoir by said walls, a fuel pipe connected to said fuel reservoir, and a vaporizing tube connected to said fuel pipe and said burner and comprising an upper vertical portion and a lower portion bent substantially at right angles to said vertical portion.

2. An oil burner for a portable oil stove, comprising a burner ring, a distributing ring, and a wind screen in the form of an undivided cylinder, the upper edge of said cylinder having an inwardly bent portion resting on the upper edge of said burner ring, said distributing ring having a projection above said bent portion for preventing said cylinder from moving upwards, and the lower edge of said distributing ring forming a shoulder bent round the inner edge of said burner ring.

3. A portable oil stove comprising a casing having a base portion and a cover, a hinge for connecting a wall of said base portion to a wall of said cover, a burner disposed in said base portion, a fuel reservoir pivotally mounted in said cover, said cover being arranged to be swung through an angle of about 180° relative to said base portion, whereby to separate said burner from said fuel reservoir by said walls, a fuel pipe connected to said fuel reservoir, a vaporizing tube connected to said burner, and a fuel pipe disposed at substantially right angles to said vaporizing tube and being connected to said fuel reservoir and said vaporizing tube.

JOHN THEODOR JOHANSSON.